United States Patent
Engelhardt

(10) Patent No.: US 10,495,477 B2
(45) Date of Patent: Dec. 3, 2019

(54) METHOD FOR GENERATING DRIVING INSTRUCTIONS FOR THE DRIVER OF AN ELECTRICALLY DRIVEN VEHICLE

(71) Applicant: Dr. Ing. h.c. F. Porsche Aktiengesellschaft, Stuttgart (DE)

(72) Inventor: Tobias Engelhardt, Stuttgart (DE)

(73) Assignee: Dr. Ing. h.c. F. Porsche Aktiengsellschaft (DE)

( * ) Notice: Subject to any disclaimer, the term of this patent is extended or adjusted under 35 U.S.C. 154(b) by 262 days.

(21) Appl. No.: 15/806,745

(22) Filed: Nov. 8, 2017

(65) Prior Publication Data

US 2018/0136004 A1 May 17, 2018

(30) Foreign Application Priority Data

Nov. 16, 2016 (DE) .................. 10 2016 122 001

(51) Int. Cl.
*B60L 15/00* (2006.01)
*B60L 15/20* (2006.01)
*G01C 21/36* (2006.01)

(52) U.S. Cl.
CPC ..... *G01C 21/3655* (2013.01); *G01C 21/3667* (2013.01); *G01C 21/3694* (2013.01); *G01C 21/3697* (2013.01); *B60L 2240/36* (2013.01); *B60L 2240/425* (2013.01); *B60L 2240/485* (2013.01); *B60L 2240/525* (2013.01); *B60L 2240/545* (2013.01); *B60W 2510/087* (2013.01); *B60W 2710/088* (2013.01)

(58) Field of Classification Search
CPC ......... B60L 2240/425; B60L 2240/545; B60L 2240/36; B60L 2240/485; B60L 2240/525; B60W 2510/087; B60W 2710/088
See application file for complete search history.

(56) References Cited

U.S. PATENT DOCUMENTS

| | | | |
|---|---|---|---|
| 7,347,168 B2* | 3/2008 | Reckels | F01P 7/167 123/41.11 |
| 9,114,727 B2* | 8/2015 | Choi | B60L 15/2045 |
| 9,557,746 B2* | 1/2017 | Nefedov | G05D 13/02 |
| 9,725,086 B2* | 8/2017 | Gehring | F01P 7/167 |
| 2018/0111486 A1* | 4/2018 | Kwon | B60K 11/00 |

FOREIGN PATENT DOCUMENTS

| | | |
|---|---|---|
| DE | 102013110346 A1 | 4/2014 |
| DE | 102015001248 A1 | 8/2016 |
| EP | 2945140 A1 | 11/2015 |
| KR | 101856372 B1 * | 5/2018 ............. B60K 11/00 |

OTHER PUBLICATIONS

German Search Report for German Application No. 10 2016 122 001.9, dated Aug. 7, 2017, with partial English translation—9 Pages.

* cited by examiner

*Primary Examiner* — Todd M Melton
(74) *Attorney, Agent, or Firm* — RatnerPrestia

(57) ABSTRACT

A method for generating driving instructions for the driver of an electrically driven vehicle includes the following steps: (a) acquire route information for at least one route section of a driving route lying ahead of the vehicle, (b) determine temperature information, acting in a temperature-varying fashion on at least one drive component, for the at least one route section on the basis of the route information, and (c) output a driving instruction to the driver on the basis of the temperature information for the at least one route section.

10 Claims, 1 Drawing Sheet

METHOD FOR GENERATING DRIVING INSTRUCTIONS FOR THE DRIVER OF AN ELECTRICALLY DRIVEN VEHICLE

CROSS-REFERENCE TO RELATED APPLICATIONS

This application claims priority to German Patent Application No. 10 2016 122 001.9, filed Nov. 16, 2016, which is incorporated by reference herein in its entirety.

FIELD OF THE INVENTION

The present invention relates to a method for generating driving instructions for the driver of an electrically driven vehicle and an instruction device for generating just such driving instructions.

BACKGROUND OF THE INVENTION

It is known that vehicles can be employed with electric drives. Electric drives are very demanding in particular with respect to the temperature management. Drive components of electrically driven vehicles are here, for example, the electric drive motor itself, a battery device or parts of the power electronics. During the operation of the vehicle, that is to say during the driving of the electric vehicle, at least some of these described drive components heat up as a result of power consumption. The greater the power consumption, the greater also the heating. However, in order to avoid undesired damage or undesired effects on individual drive components, it is necessary to keep the operating temperature for the respective drive component below a maximum permissible temperature limit. The power consumption depends, on the one hand, on the driving behavior of the driver and, on the other hand, on the route profile ahead of the vehicle.

In the known solutions, the temperature of the individual drive components is monitored. As soon as the available cooling capacity is no longer sufficient to keep the temperature of the respective drive component low enough or below a predefined threshold value, a control intervention into the power control of the vehicle usually takes place automatically. In other words, in order to avoid an excessively high temperature the power consumption is reduced or blocked at a threshold value, with the result that increased or normal power consumption is no longer possible. This procedure is also referred to as derating and leads to a situation in which for a certain period of time the complete electrical performance capability of the drive components is no longer available to the driver of the vehicle in order to avoid overheating of individual drive components. A decisive disadvantage here is that the driving variability for the driver is significantly restricted for the sake of this protection mechanism. Therefore, in this context he cannot exert any influence whatsoever on the time and the driving situation in which this derating occurs or starts. This leads, in particular, to reduced acceptance of such systems and overall of electric vehicles with the respective drivers.

SUMMARY OF THE INVENTION

An aim of the present invention is at least to partially overcome the disadvantages described above. In particular, to improve in a cost-effective and simple fashion the drivability of a vehicle and, in particular, also the driving experience for the driver.

Described herein is method and instruction device for achieving this aim. Features and details which are described in relation to the method according to aspects of the invention also apply in relation to the instruction device according to aspects of the invention, and respectively vice versa, with the result that in terms of the disclosure it is also possible to make reference to the individual aspects of the invention in a reciprocal fashion.

A method according to aspects of the invention serves to generate driving instructions for the driver of an electrically driven vehicle. For this purpose, the method comprises the following steps:

a) acquiring route information for at least section of a driving route lying ahead of the vehicle, b) determining temperature information, acting in a temperature-varying fashion on at least one drive component, for the at least one route section on the basis of the route information, and c) outputting a driving instruction to the driver on the basis of the temperature information for the at least one route section.

A method according to aspects of the invention differs in the core concept from the known solutions in that automatic control of the power consumption is either completely replaced by a method according to aspects of the invention or else is supplemented by said method. This leads to a situation in which the driver continues to have full control over the power consumption of the vehicle, and preferably in combination with the known solutions, the automatic control intervenes in a regulating fashion into the power consumption only when the overheating of a corresponding drive component is actually taking place.

In order to return this freedom in terms of the power consumption to the driver, in an inventive fashion monitoring steps are carried out in order to provide information about the current state and, in particular, the expected future state of the mode of operation of the vehicle. In a first step, for this purpose route information is acquired which is based on the at least one route section on a driving route lying ahead of the vehicle. The driving route ahead of the vehicle can be, for example, the area directly ahead of the vehicle here, with the result that solely by means of the geographical position at which the vehicle is located it is possible to determine clearly to what extent the next route section, for example the next 100 meters or the next 2 km will define with maximum or high probability a route section as a route profile. Of course, it is also conceivable that the driving route can be taken up by a navigation system which supplies a unique reference point as to which driving route will also be traveled along with a high probability by the vehicle for a relatively large distance.

A route section is here part of the driving route lying ahead of the vehicle, in particular it is here the route section or a multiplicity of two or more route sections which are arranged sequentially one after the other on the driving route directly ahead of the vehicle. The route section or the multiplicity of route sections therefore preferably make up in their combination and totality the driving route ahead of the vehicle.

Route information for the respective route section includes, in particular, route parameters that will be explained in more detail below. It can generally be stated that the route information according to the present invention includes information as to how this subsequent route section will affect the temperature development. Such route information can be, for example, the general route profile, differences in altitude, differences in gradient or changes in gradient or the like. A more detailed explanation of this will be given later. The route information can, in particular, also be understood as meaning the profile of a circular route. A circular route, which can also be referred to as a race track, is usually traveled through multiple times in succession. The profile of the circular route can therefore be learnt as route information when it is first traveled through or else can be loaded as a data record even before the start of the travel. The objective of a method according to aspects of the invention when used on a circular route is to improve the lap time. This is achieved by outputting the driving instruction for optimized acceleration. Optimized acceleration is to be understood here as the maximum acceleration while avoiding overheating of the drive components.

According to aspects of the invention, temperature information can then be determined on the basis of the route information. The temperature information is then no longer acquired using an external sensor system but rather can be determined essentially preferably exclusively on the basis of the route information. For this purpose, for example comparison lists are used, with the result that depending on which route information is present, associated temperature information can be determined. For example, an expected gradient of a future route section may be specified as route information. A large gradient will lead to a situation in which a corresponding large positive change in temperature, that is to say an increase in temperature, is to be expected as temperature information. However, if the gradient is a small gradient or even a negative gradient, the associated temperature information can be determined to the effect that a relatively small positive or even a negative change in temperature is to be expected. In other words, the method according to aspects of the invention then correlates the acquired route information with the corresponding temperature-changing effect on the at least one drive component and makes available this correlation in the form of temperature information to the method.

As a concluding method step, a driving instruction is then output to the driver on the basis of this temperature information. Contrary to the known solutions, no active intervention into the actual power consumption is made on the basis of the temperature information or on the basis of current temperature measurements of the individual drive components. The known solutions give rise to automated regulation of the power consumption of the electrical vehicle, which cannot be influenced by the driver. The core concept of the present invention is, however, already to inform the driver in advance about the corresponding route section, on the basis of this temperature information by outputting a driving instruction. The driving instruction includes here, in particular, information such as will be explained in more detail below, which information is concerned with the power consumption of the vehicle. It is therefore possible, for example in the case of route information which makes it possible to determine temperature information, which in turn gives rise to an increase which can be expected in the temperatures of the operating components, for the driving instruction to include corresponding information to the effect that the power consumption is to be throttled by the driver. However, if it is known that there is possibly a cooling means in the course of the future route section, the driving instruction can make available to the driver the possibility of further accelerating or of further opening of the throttle on the basis of this route information and the associated temperature information. The driving instruction can also include analytical information. Such analytical information specifies how well the driver has followed the driving instructions and accordingly states how efficient the previous travel was in terms of thermal criteria. For example, a color display is therefore conceivable which preferably indicates in green that the previous driving behavior was thermally efficient. Another color, for example red, includes the information that the previous driving style leads to overheating of the at least one drive component. A third color, for example blue, can indicate that there is still acceleration potential from the thermal point of view with respect to the at least one drive component, that is to say the travel was too slow.

On the basis of a method according to aspects of the invention it is then possible for the driver to receive or retain complete control over the power consumption, and nevertheless an improved temperature management means is provided for the individual drive components. This leads to a situation in which when the driver follows the driving instructions which are output, said driver can, despite having complete control over the vehicle, completely avoid a situation in which derating, that is to say automatic downward regulation of the power consumption, takes place, or can at least reduce such a situation to a relatively small number of situations.

The driving experience, the drivability and, in particular, the possibility of the driver affecting the driving sensation are considerably improved here.

According to aspects of the invention, it is advantageous if in a method according to aspects of the invention the route information has at least one of the following route parameters for the route section:
 a) curve profile of the route section
 b) gradient profile of the route section
 c) underlying surface of the route section and
 d) weather information for the route section.

The above enumeration does not constitute a conclusive list. The curve profile is, by way of the corresponding power correlation, an indicator as to what power consumption is to be expected for this route section. The expected gradient profile on the route section is particularly decisive. Therefore, in the case of a positive gradient profile the power consumption will be higher than in the case of a negative gradient profile, which could possibly even permit the individual drive components to be cooled. The underlying surface also permits conclusions to be drawn as to what speed a movement is subsequently possible on the route section. If it is, for example, a freeway, a higher average speed is to be expected than is the case with a forest track. Weather information can also supply different data which can be decisive for the subsequent temperature information. Therefore, for example wet underlying surfaces give rise to changed coefficients of friction with the underlying surface and the different external temperatures likewise also give rise to different initial temperatures at the drive components or to different cooling possibilities. In all cases, the individual route parameter can include both qualitative and quantitative parameters or combine them with one another. Of course, further parameters of this type are also possible in order to be able to represent the influence on the heating capacity.

A further advantage may be that in a method according to aspects of the invention the temperature information has at least one of the following temperature parameters for the route section:
 a) expected power consumption of the drive components
 b) coding capacity for the drive components and
 c) heating situation for the drive components.

The above enumeration does not constitute a conclusive list. The individual temperature parameters can again be configured in an abstract, qualitative and/or quantitative fashion. The expected power consumption also relates here, in particular, to current temperature, explained later, and therefore also includes an initial temperature for the individual drive components.

It is also advantageous if in a method according to aspects of the invention an expected heating capacity for at least one mode of operation of the vehicle on the at least one route section, preferably an optimum mode of operation, is determined on the basis of the route information. An optimum mode of operation is to be understood here as being, in particular, a thermally optimized or thermally optimum mode of operation. Therefore, as soon as the route information is known, an expected heating capacity can be determined using the temperature information, which heating capacity accordingly makes it possible to determine in advance an increase in temperature for the individual drive components. Heating sections and cooling sections on the associated route section can therefore be detected and correspondingly taken into account in the outputting of the driving instruction.

Furthermore, it is advantageous if in a method according to aspects of the invention a change in temperature is determined on the basis of the expected heating capacity and a current temperature of at least one drive component and is used as the basis for the outputting of the driving instruction. This determined change in temperature therefore includes a future driving style which is to be particularly expected, with the result that correspondingly a change in the current driving style makes a modified change in the temperature and therefore optimized temperature management possible. The temperature information now includes information both about the current operation state and about the current temperature state of the individual drive components.

Furthermore, it is advantageous if in a method according to aspects of the invention the current temperature of the at least one drive component determined and subsequently taken into account during the outputting of the driving instruction to the driver. The current temperature can be determined here, for example, by means of a corresponding temperature sensor system and fed into the method according to aspects of the invention. The initial point can therefore be determined, with the result that in a cold state of the drive components other driving instructions are expected than is the case with drive components which are already heated.

It can be a further advantage if in a method according to aspects of the invention the driving instruction to the driver includes a predefinition for a performance request by the driver for the at least one drive component. This means, in particular, the request with respect to the acceleration, the speed or the braking behavior of the vehicle. Different modes of operation can also be applied by the driver, for example an eco mode or a sport mode. The so-called coasting possibility in which the vehicle carries out a coasting forward movement essentially without active power consumption but also without a braking intervention, can also be suggested to the driver by means of a driving instruction.

Furthermore, it can be advantageous if in a method according to aspects of the invention the outputting of the driving instruction to the driver has a color coding. Of course, other coding, in particular in a visual fashion or in a graphic fashion, is also conceivable. Color coding can include, for example, red coding for a braking instruction and green coding for an acceleration instruction. Of course, combinations of color coding with graphic coding, for example in the form of changing bars, can also be possible.

A subject matter of the present invention is likewise an instruction device for generating driving instructions for the driver of an electrically driven vehicle. Such an instruction device has an acquisition module for acquiring route information for at least one route section of a driving route lying ahead of the vehicle. Furthermore, a determining module is provided for determining temperature information, acting in a temperature-changing fashion on at least one drive component, for the at least one route section on the basis of the route information. An output module, in particular having a display device, serves to output a driving instruction to the driver on the basis of the temperature information for the at least one route section. Such an instruction device has, in particular, an acquisition module, a determining module and an output module for executing a method according to aspects of the invention, with the result that the instruction device entails the same advantages as have been explained in detail with respect to a method according to aspects of the invention.

BRIEF DESCRIPTION OF THE DRAWINGS

Further advantages, features and details of the invention can be found in the following description in which exemplary embodiments of the invention are described in detail with respect to the drawings. In this context, the features which are mentioned in the claims and in the description are respectively essential to the invention both individually per se or any desired combination. In the drawings, in each case in schematic form:

DETAILED DESCRIPTION OF THE INVENTION

Figure 2:
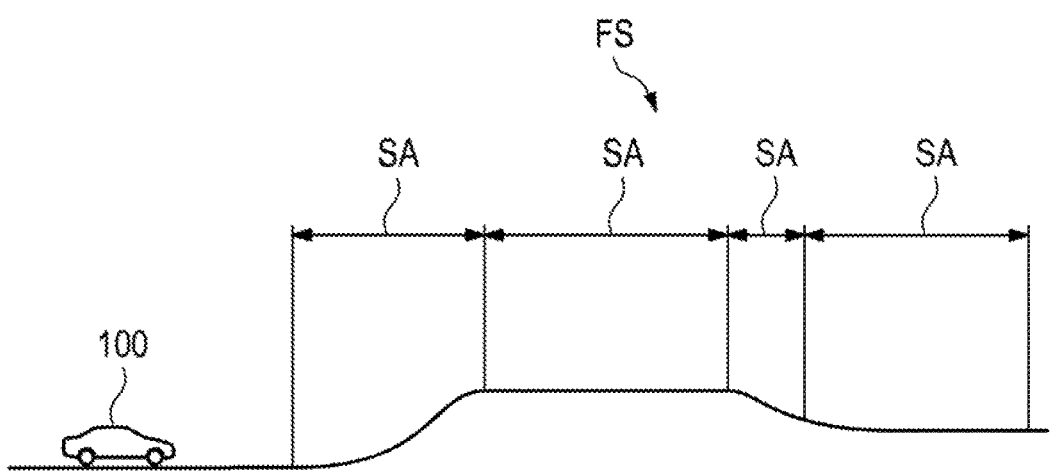

FIG. 2 shows how a vehicle 100 can travel along a driving route FS ahead of said vehicle. This driving route FS for the vehicle 100 can be acquired in advance, for example by means of a navigation system or may be already known. A route profile which is essentially invariable ahead of the vehicle 100, which route profile is provided without junctions or possibilities of making a wrong turn, can provide a significant indication of the expected driving route FS for the vehicle 100.

From FIG. 2 it is also apparent that the driving route FS which lies ahead of the vehicle 100 can then be divided into different route sections SA. The individual route sections SA are, as is also shown by FIG. 2, preferably arranged sequentially one after the other and in particular directly sequentially one after the other. Each route section SA has here associated route information SI which can include one or more route parameters. FIG. 2 shows a lateral cross section, with the result that here in particular the respective gradient of the driving route FS in this route section SA can be included as route information SI. If the driving route FS is a circular route, the represented profile is repeated from one lap to another. The analysis of the previous driving behavior, which has already been explained repeatedly, can thus be carried out and added as an analytical information to the driving instruction.

Figure 1:
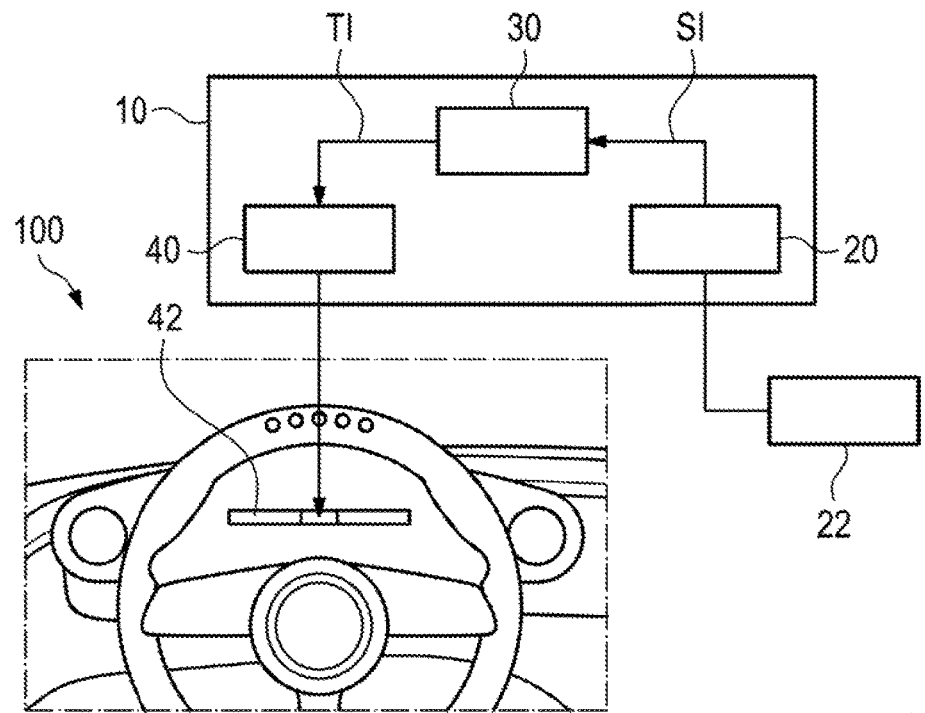
FIG. 1 shows an illustration of an instruction device according aspects of the invention and FIG. 2 shows illustration of driving route for a vehicle.

FIG. 1 then shows the point of view of a driver of a vehicle 100 when his vehicle 100 travels along the driving route FS according to FIG. 2. In order to carry out the method, the vehicle 100 is now equipped according to FIG. 1 with an instruction device 10 which carries out the method according to aspects of the invention. As soon as the vehicle 100 according to FIG. 2 then approaches the first route section SA, one or more route sections SA can be analyzed using the acquisition module 20, for example by means of a navigation device 22. The result of this analysis is the acquisition of route information SI for the respective route section SA. In the present case, this route information SI includes, for example, the respective gradient in the associated route section SA. Within the instruction device 10, temperature information TI can then be determined from this route information SI, that is to say for example from the gradient in the respective route section SA. The determining module 30 correlates here, for example, the corresponding parameters by means of a list or further data. The larger the associated gradient in the route section SA, the larger also an expected change in temperature, that is to say a heating capacity at the corresponding drive component as part of the temperature information TI. In this context, inventory information, for example the current temperature of the individual drive components, can also be taken into account. On this basis, the temperature information TI in the output module 40 can then be applied to output a driving instruction to the driver. This driving instruction can include both an instruction with respect to acceleration behavior and analysis information relating to the previous driving behavior of the driver. In this way, the driver can, in particular in the case of operation of the vehicle 100 on a circular route learn a thermally more efficient driving style with a simultaneously thermally optimized acceleration behavior.

The outputting of this driving instruction takes place using a display device 42 which is embodied here as a transverse bar. In this context, this transverse bar can preferably have color coding in order to inform the driver in the driving instruction about a preferred or a predefined power consumption. A corresponding predefinition for the driver can therefore include opening the throttle, that is to say corresponding possible acceleration, as well as the instruction to reduce the power consumption, in order to avoid or delay what is referred to as derating.

The explanation of the embodiments given above describes the present invention exclusively by means of examples. Of course, individual features of the embodiments can, where technically appropriate, be freely combined with one another without departing from the scope of the present invention.

What is claimed is:

1. A method for generating driving instructions driver of an electrically driven vehicle, comprising the following steps:
   acquiring route information for at least one route section of a driving route lying ahead of the vehicle;
   determining temperature information, acting in a temperature-varying fashion on at least one drive component of the vehicle, for the at least one route section on the basis of the route information; and
   outputting a driving instruction to the driver on the basis of the temperature information for the at least one route section.

2. The method as claimed in claim 1, wherein the route information has at least one of the following route parameters for the route section:
   curve profile of the route section;
   gradient profile of the route section;
   underlying surface of the route section; and
   weather information for the route section.

3. The method as claimed in claim 1, wherein the temperature information has at least one of the following temperature parameters for the route section:
   expected power consumption of the at least one drive component;
   cooling capacity for the at least one drive component; and
   heating situation for the at least one drive component.

4. The method as claimed in claim 1, further comprising the step of determining an expected heating capacity for at least one mode of operation of the vehicle on the at least one route section on the basis of the route information.

5. The method as claimed in claim 4, further comprising the steps of (i) determining a change in temperature on the basis of the expected heating capacity, and (ii) using a current temperature of the at least one drive component as a basis for the outputting of the driving instruction.

6. The method as claimed in claim 5, further comprising the steps of (i) determining the current temperature of the at least one drive component, and (ii) subsequently accounting for the current temperature during the outputting of the driving instruction to the driver.

7. The method as claimed in claim 1, wherein the driving instruction to the driver includes a predefinition for a performance request by the driver for the at least one drive component.

8. The method as claimed in claim 1, wherein the outputting of the driving instruction to the driver has a color coding.

9. An instruction device for generating driving instructions for a driver of an electrically driven vehicle, comprising:
   an acquisition module for acquiring route information for at least one route section of a driving route lying ahead of the vehicle,
   a determining module for determining temperature information acting in a temperature-changing fashion on at least one drive component of the vehicle, for the at least one route section on the basis of the route information, and
   an output module having a display device for outputting a driving instruction to the driver on the basis of the temperature information for the at least one route section.

10. The instruction device as claimed in claim 9, wherein the acquisition module, the determining module and the output module are configured to execute the following method:
   acquiring route information for at least one route section of the driving route lying ahead of the vehicle;
   determining the temperature information acting in temperature-varying fashion on the at least one drive component of the vehicle, for the at least one route section on the basis of the route information; and
   outputting the driving instruction to the driver on the basis of the temperature information for the at least one route section.

* * * * *